United States Patent
Li

(12) 
(10) Patent No.: US 6,515,262 B1
(45) Date of Patent: Feb. 4, 2003

(54) DEEP WELL COOKER WITH DUAL HEATING ELEMENTS

(76) Inventor: George T. C. Li, P.O. Box 290, Ridgeway, VA (US) 24148

(*) Notice: Subject to any disclaimer, the term of this patent is extended or adjusted under 35 U.S.C. 154(b) by 0 days.

(21) Appl. No.: 09/901,789

(22) Filed: Jul. 11, 2001

(51) Int. Cl.[7] .............................. H05B 3/08; H05B 3/58; A47J 27/00
(52) U.S. Cl. ....................... 219/429; 219/435; 219/436; 219/541; 219/542; 219/546; 219/549
(58) Field of Search ................................ 219/429, 385, 219/386, 417, 432, 433, 435, 436, 541, 542, 546, 548, 549

(56) References Cited

U.S. PATENT DOCUMENTS

| | | | |
|---|---|---|---|
| 1,046,888 A | * 12/1912 | Stanley ........................ 219/436 |
| 2,074,985 A | * 3/1937 | Hofferbert ................... 219/417 |
| 2,103,560 A | * 12/1937 | Smith et al. ................. 219/417 |
| 2,187,888 A | * 1/1940 | Nachumsohn ............... 219/417 |
| 2,292,854 A | * 8/1942 | Wilcox ........................ 219/436 |
| 2,371,975 A | * 3/1945 | Parsons ....................... 219/433 |
| 3,393,295 A | 7/1968 | Jepson et al. ................ 219/398 |
| 3,508,485 A | 4/1970 | Munsey ......................... 99/331 |
| D230,243 S | 2/1974 | Ottenstein ..................... D7/96 |
| 3,881,090 A | * 4/1975 | Scott ........................... 219/433 |
| 3,981,044 A | 9/1976 | Luebke et al. ............. 16/114 A |
| 4,024,377 A | 5/1977 | Henke ......................... 219/439 |
| D283,666 S | 5/1986 | Holzkopf ....................... D7/38 |
| D284,727 S | 7/1986 | Gerber ........................... D7/21 |
| 4,672,179 A | * 6/1987 | Onishi et al. ............... 219/436 |
| D305,855 S | 2/1990 | Mandat ........................ D7/323 |
| 5,048,882 A | 9/1991 | Fielding et al. ............... 294/33 |
| 5,359,179 A | * 10/1994 | Desloge et al. ............. 219/535 |
| D358,292 S | 5/1995 | Goad ........................... D7/366 |
| 5,552,577 A | 9/1996 | Su .............................. 219/401 |
| 5,656,188 A | 8/1997 | Janowiak et al. ........... 219/438 |
| 5,746,117 A | 5/1998 | Chang .......................... 99/407 |
| 6,082,249 A | 7/2000 | Su .............................. 99/340 |
| D431,149 S | 9/2000 | Cooke et al. ................ D7/354 |
| 6,173,643 B1 | 1/2001 | Qian et al. .................... 99/339 |
| 6,274,847 B1 | * 8/2001 | Hlava et al. ................ 219/433 |

* cited by examiner

*Primary Examiner*—Joseph Pelham
(74) *Attorney, Agent, or Firm*—Clifford F. Ray

(57) ABSTRACT

A multifunctional cooking system including a deep well cooker that includes a bottom heating element and a wrap-around heating element which are disposed about the deep well member for heating the side walls thereof is disclosed. The heating elements are fabricated in alternative embodiments to provide one-sided or double-sided configurations for particular applications. Both the bottom heating element and the wrap-around heating element are electrically interconnected by a temperature controlling device for heat regulation and a multi-function controller for selectively energizing the heating elements individually or in combination for various cooking modes.

19 Claims, 6 Drawing Sheets

DEEP WELL COOKER WITH DUAL HEATING ELEMENTS

BACKGROUND OF INVENTION

1. Field of Invention

The present invention relates to cooking appliances and, more particularly, to a multifunctional cooking system including a deep well cooker having a plurality of heating elements capable of being selectively energized to correspond to different cooking modes.

Electric cooking pots for preparing and serving hot foods are well known in the art. Such cooking pots typically include a deep well member and a heating element arranged in functional relation thereto for supplying heat. Such deep well members are often constructed of stainless steel or enameled steel for reasons of sanitation and durability. It is known that both stainless steel and enameled steel have a relatively low coefficient of heat conductivity as compared with other metals.

Applying heat only to the bottom of a deep well member, especially when constructed of stainless steel or enameled steel, can result in the upper portion of the deep well member being insufficiently heated. Thus, the food in the upper portion of the well member may become too cool for serving purposes due to the loss of heat in combination with the low rate of heat conductivity of the stainless steel or enameled steel material and the slow rate at which heat is supplied to the upper portion of the deep well member.

2. Description of the Prior Art

Various solutions have been proposed in the prior art to solve this problem. One example of a prior art deep well cooker is disclosed in U.S. Pat. No. 4,024,377 to Henke comprising a heat sink preferably formed of aluminum or another corrosion resistant metal having a relatively high coefficient of heat conductivity, which is positioned over the deep well member from below. The heat sink member is generally U-shaped and has a bottom part parallel to and spaced from the bottom of the well member and side parts parallel to and engaging the sides of the well member in heat exchanging relation. An electric heating element is disposed in the space between the bottom of the well member and the bottom part of the U-shaped heat sink member. When the electric heater is energized, heat is supplied to the bottom of the well member by direct radiation and by radiation from the bottom part of the U-shaped member and by convection due to the air in the space occupied by the heating element. Simultaneously, however, heat also flows from the bottom part of the U-shaped member, up the side parts of the U-shaped member and into the sides of the well member. The heat supplied by conduction to the sides of the well member provides for more uniform heating of the well member while also providing for more efficient utilization of the energy supplied to the heating element.

Another example of a prior art cooking device having multiple heating elements is disclosed in U.S. Pat. No. 3,393,295 to Jepson et. al. comprising a pan with a lower electric heating element supported on its underside and a deep cover with an upper heating element supported within. A thermostatic control is connected to the lower heating element for energization thereof. When the cover is closed, an electrical connection for energizing the upper heating element is completed. The control serves thermostatically to control the energization of either element in a repeating, alternating sequence and is capable of performing the functions of a frying pan, broiler, and oven. However, this invention is not directly applicable to deep well cookers nor does it disclose a wrap-around heating element for controlling heat distribution to the upper surfaces of a deep well member within such a cooker.

Thus, the present invention has been developed to provide an alternative solution to the problem of regulating the distribution of heat to all surfaces within a deep well cooker and also to provide other functional advantages over the prior art.

SUMMARY OF THE INVENTION

Accordingly, the present invention provides a multifunctional deep well cooker that includes a bottom heating element and a wrap-around heating element, which is disposed about the deep well member for heating the sides thereof The bottom heating element and the wrap-around heating element are interconnected by a temperature control switch for heat regulation and a function control switch for selectively energizing the desired heating elements individually or in combination to provide various different cooking modes. Thus, the present multifunctional cooker is capable of providing the user with a wide variety of cooking modes such as steaming, stir-frying, roasting, baking, or deep-frying within a single deep well cooker by selectively energizing the respective heating elements and using optional cooking accessories such as lift racks and/or frying baskets, which are applicable to a particular cooking technique.

Other features and technical advantages of the present invention will become apparent from a study of the following description and the accompanying drawings.

BRIEF DESCRIPTIONS OF THE DRAWINGS

The novel features of the present invention are set forth in the appended claims. The invention itself however, as well as other features and advantages thereof will be best understood by reference to the following detailed description of an illustrative embodiment when read in conjunction with the accompanying figures wherein:

DETAILED DESCRIPTION OF THE PREFERRED EMBODIMENTS

Figure 1A:
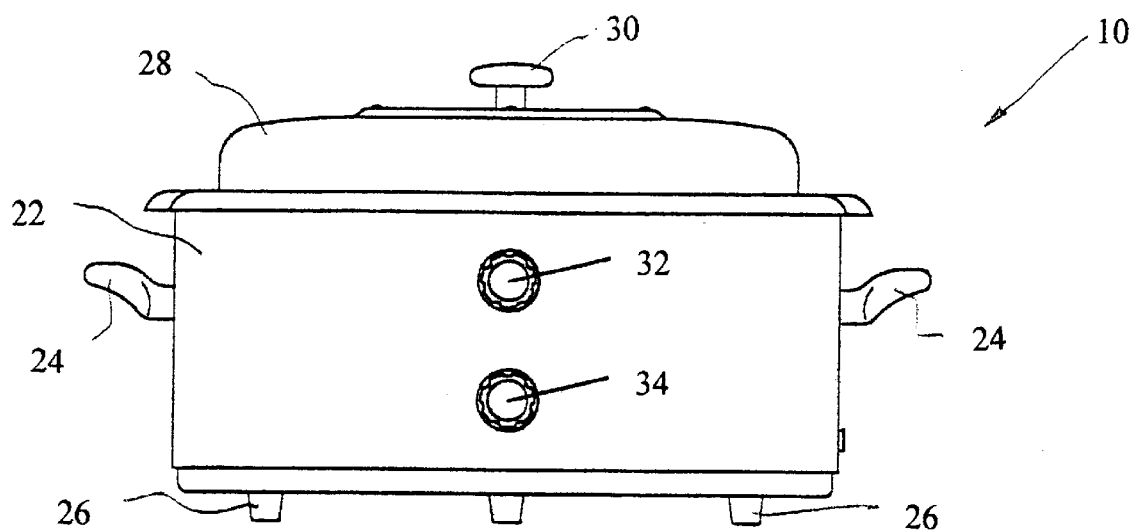
FIG. 1A is a front elevational view of the multifunctional deep well cooker of the present invention.

With further reference to the drawings, there is shown therein a preferred embodiment of a multifunctional deep well cooker in accordance with the present invention, indicated generally at 10, and illustrated in FIG. 1. The present multifunctional deep well cooker 10 is comprised of an outer housing 22 equipped with external handles 24 and feet 26. Cooker 10 is also provided with a hinged lid 28 equipped with a knob or handle 30. Lid 28 includes an odor eliminating filter assembly 15.

In the preferred embodiment the housing 22 is constructed of sheet steel or other suitable material and is provided in different exterior finishes such as powder coating, stainless steel, or plated steel with different accent finishes such as copper and bronze.

The present cooker 10 also includes an inner deep well member 36 including a peripheral flange member 36a integrally formed thereon. The deep well member 36 is resides permanently within the housing 22 such that the flange 36a is disposed about the upper edge of the housing 22 as shown in FIG. 1B. The deep well member 36 is constructed of enamel-coated steel, cast aluminum, or cast iron having different surface finishes such as a nonstick coating and/or an anodized coating.

Figure 2:
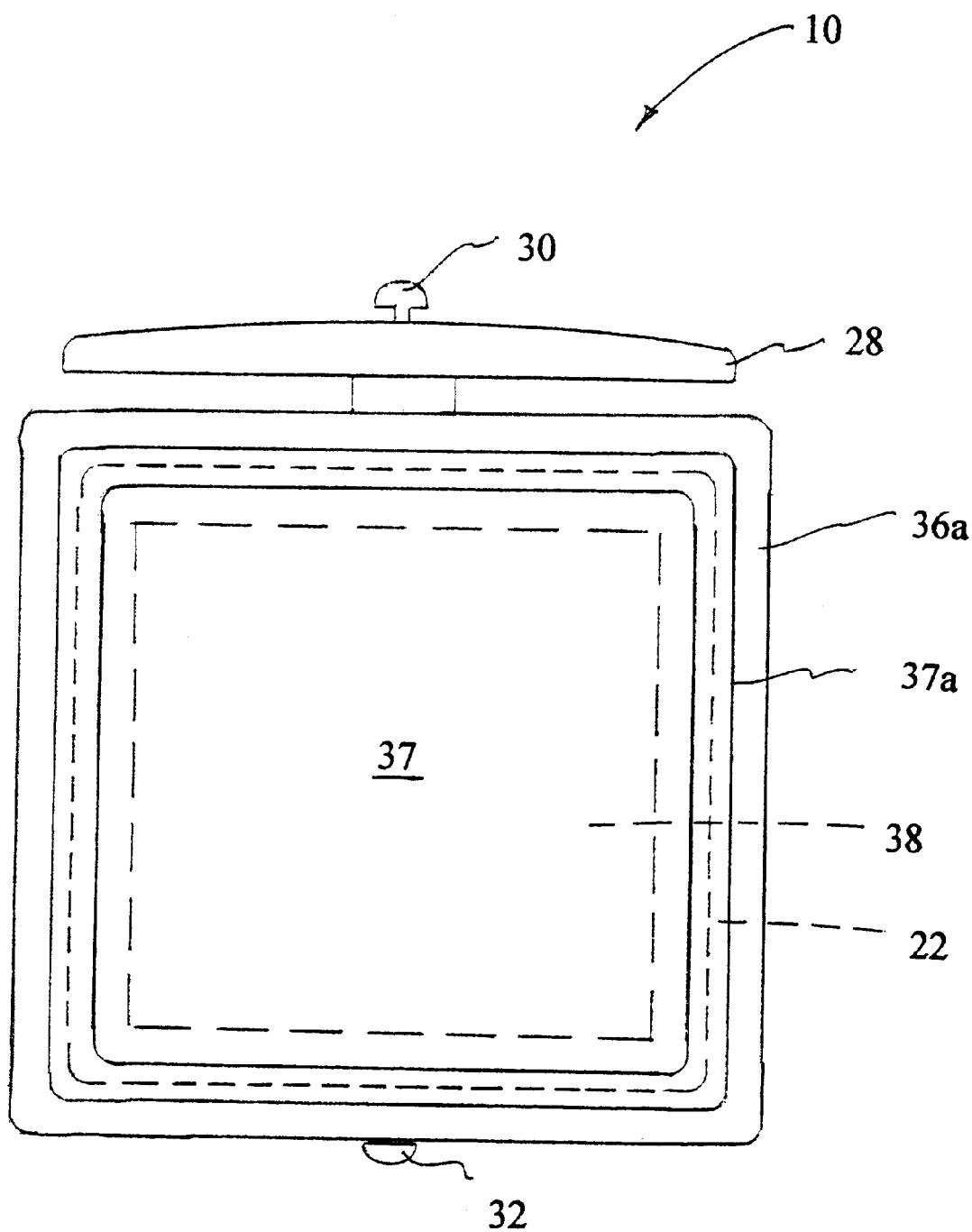
FIG. 2 is a top plan view of the multifunctional cooker showing the position of the bottom heating element.

In the preferred embodiment the present cooker 10 also includes a removable cooking well 37 as most clearly shown in FIG. 2, which is also constructed of stainless steel, enamel-coated steel, cast aluminum or other suitable material. The cooking well 37 is easily removed from the deep well member 36 for washing for the convenience of the user.

A layer of heat resistant insulating material (not shown) is disposed in the air space as at 20 between the housing 22 and the deep well member 36. Numerous types of heat insulating materials having physical and chemical properties suitable for this application are commercially available. Since such heat insulating materials are well known to those skilled in the art, further detailed discussion of the same is not deemed necessary.

Figure 1B:
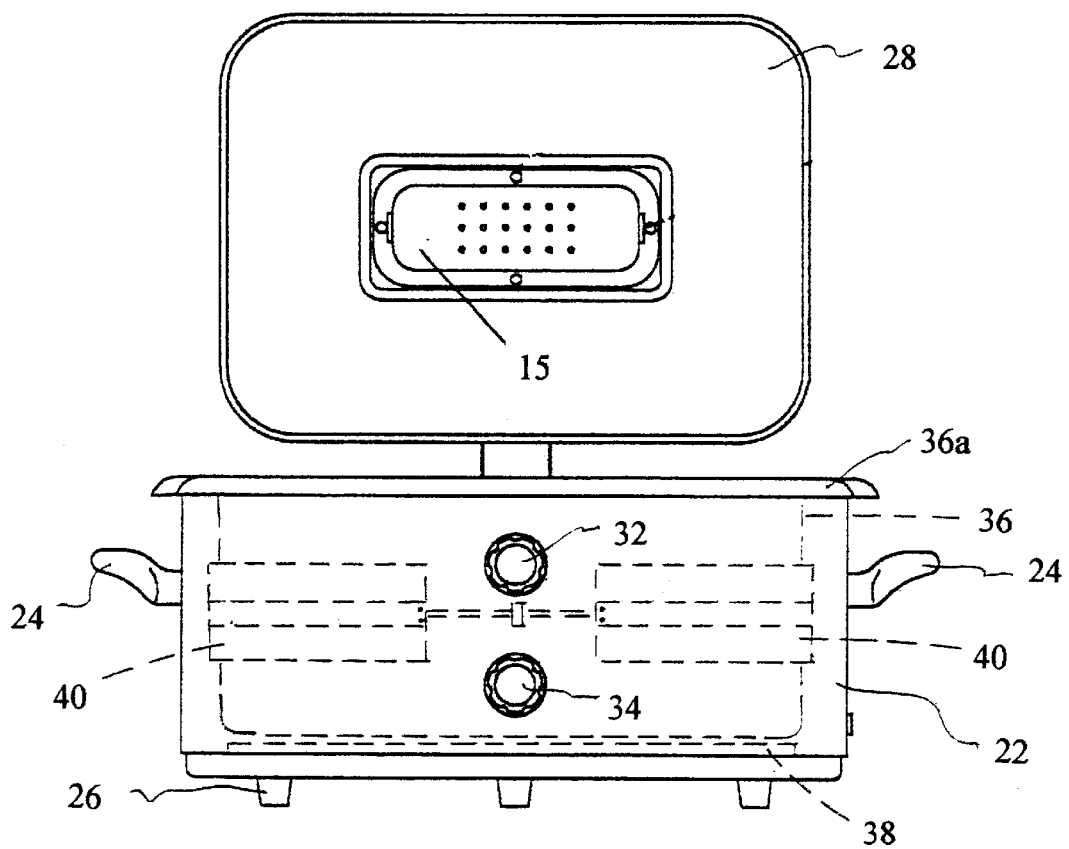
FIG. 1B is a front elevation view of the multifunctional cooker in an open condition showing the positions of the wrap-around and bottom elements.

A temperature control switch 32 and a multi-function control switch 34 are mounted within the housing 22 to provide the various functions of the present cooker as shown in FIGS. 1A and 1B. The temperature control switch 32 and the function control switch 34 are electrically interconnected with the bottom heating element 38 and the wrap-around heating element 40 and regulate their operation as explained hereinafter in further detail.

Referring again to FIG. 2, it can be seen that the present cooker 10 is generally rectangular in the preferred embodiment. However, it will be appreciated that the cooker 10 may also be constructed in an oval, circular, or square configuration. It will be understood that the bottom heating element 38 is constructed to approximate the dimensions of the deep well member 36 and, similarly, the wrap-around heating element 40 is configured to approximate the circumference of the deep well member 36. In this manner, optimal heating of both the bottom and side wall surfaces of the deep well member 36 can be achieved at all times during operation of the present cooking system.

Figure 3:
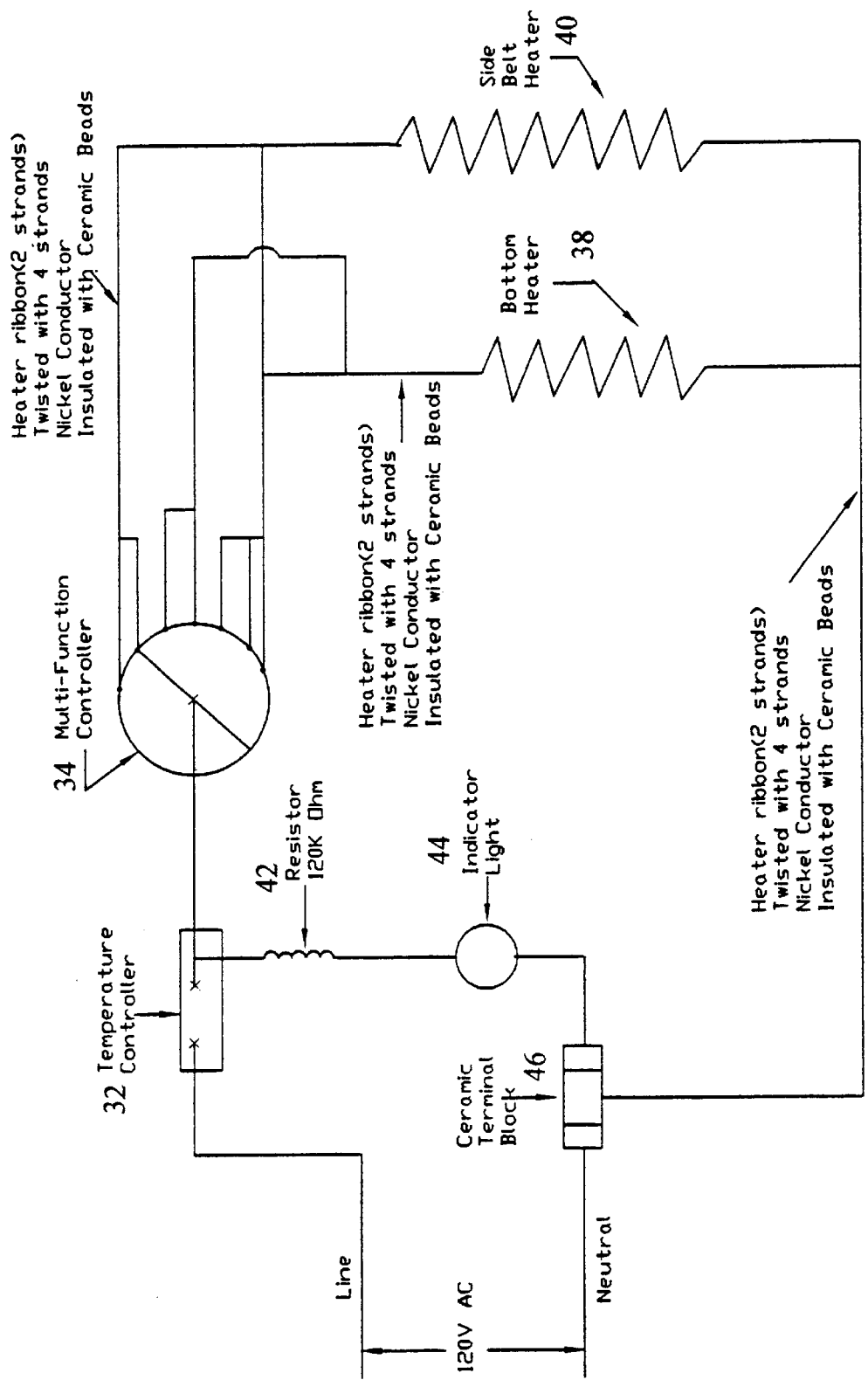
FIG. 3 is a schematic diagram representing the electrical circuitry and components of the present multifunctional deep well cooker.

Referring now to FIG. 3, there is shown therein a schematic representation of the electrical circuitry and components of the present cooking system. It will be appreciated by those skilled in the art that the present cooking system is designed for use with a standard 120 Volt/60 Hz household electrical system. The temperature control circuit includes the temperature control switch 32, which is electrically connected to resistor 42, which in turn is connected to an indicator light 44 and in turn to the ceramic terminal block 46. The temperature control switch 32 is also electrically interconnected to the function control switch 34, which is capable of passing current to either bottom heater 38 or wrap-around heater 40 individually or in combination to selectively energize the heating elements depending upon the desired cooking mode. In the preferred embodiment the bottom heater 38 operates in the range of 400 to 600 watts and the wraparound heater at a level of 600 watts. Of course these wattage ratings may vary for a given application and cooker capacity.

Although the function control switch 34 is depicted in the schematic as a conventional electro-mechanical switch, it will be understood that the selection of the bottom heater 38 and the wrap-around heater 40 may be accomplished by digital or other electrical controls and that the example shown is intended to be merely illustrative and not restrictive in any sense.

Figure 4:
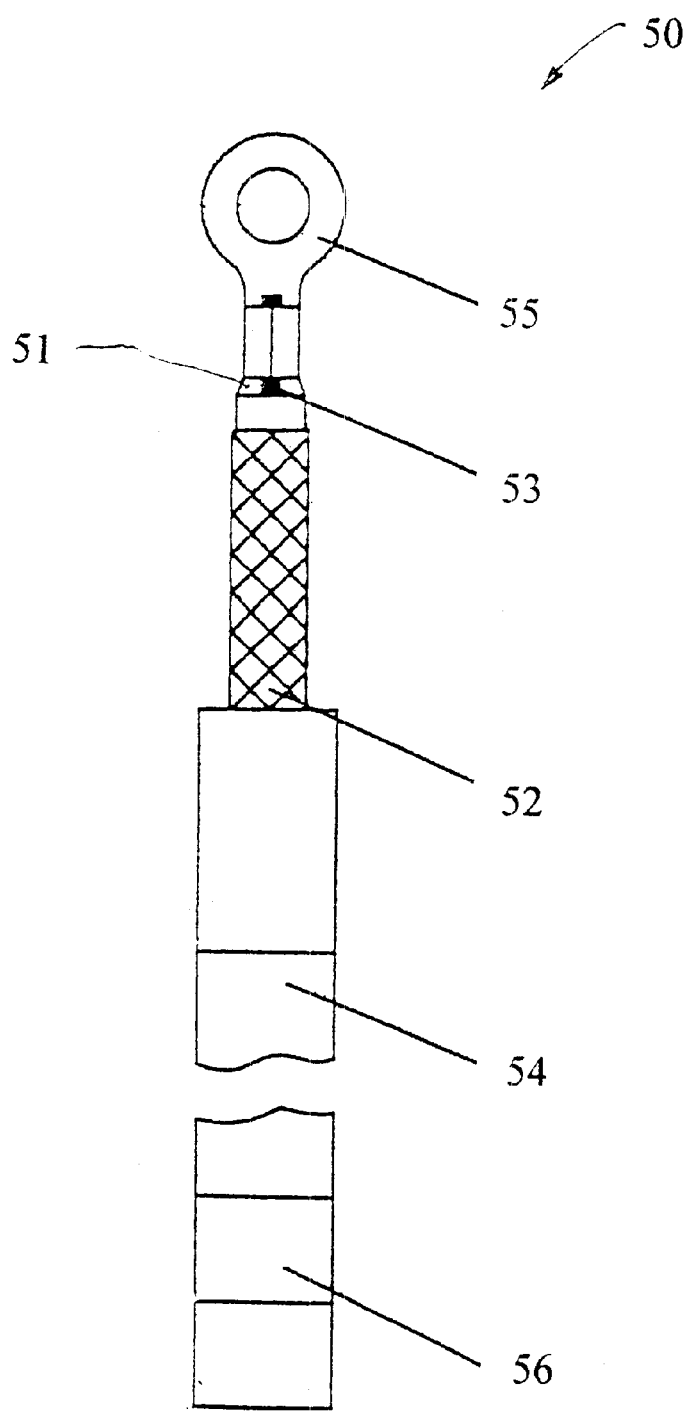
FIG. 4 is a plan view of the wire lead assembly of the heating element of the present invention.

Referring now to FIG. 4 there is shown therein a heater lead wire assembly, indicated generally at 50, for installation on the terminal ends of the heater ribbon strands or wire 53. In the manufacturing process the terminal ends of the heater wire 53 are tightly twisted with a bundle of nickel conductors 51 to create a heat sink, which effectively insulates the heater wire 53 from the temperature controls. Further, the twisted bundle of nickel conductors 51 and heater wire 53 is covered with a fiberglass insulation sleeve 52 and further insulated by ceramic sleeves 54 and 56 to insure that the temperature controls are accurate and not influenced by their proximity to the wraparound heater element 40. A terminal loop connector 55 is applied to the terminal end of the heater lead wire assembly 50 in a known manner for connection to terminal block 46.

Figure 5A:
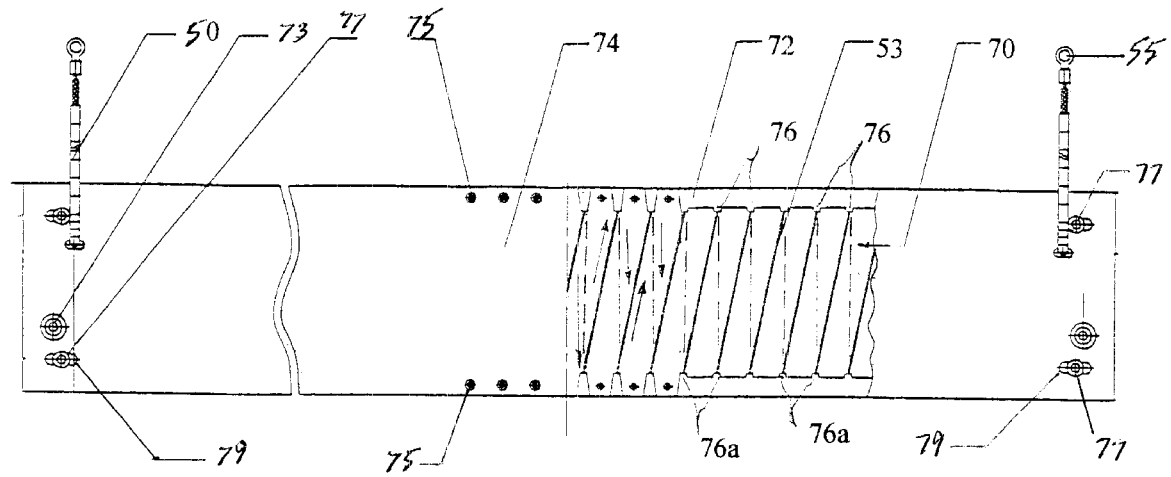
FIG. 5 is a composite diagram showing the details of the construction of the wrap-around heating element.
Figure 5B:
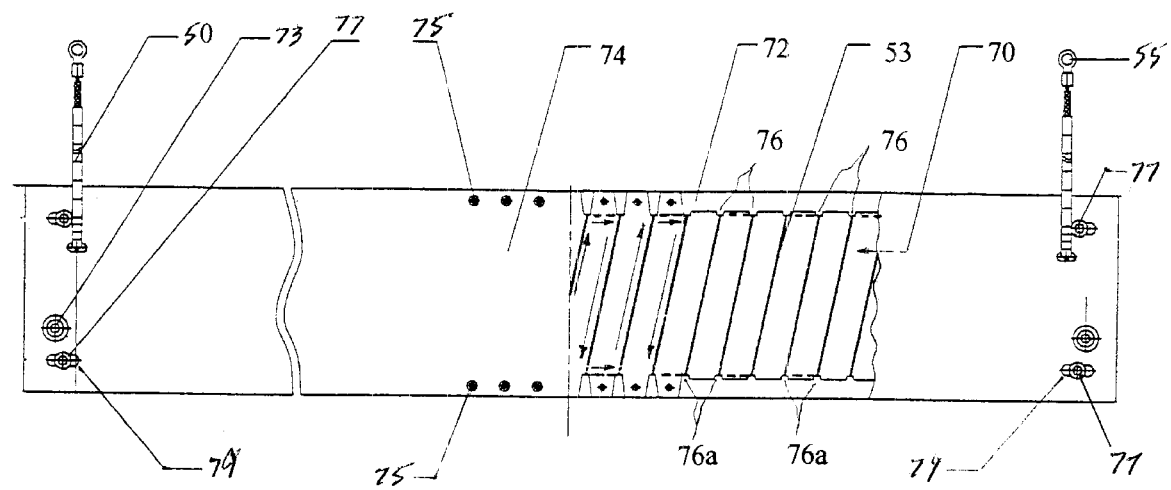

Referring now to FIGS. 5A and 5B, the details of the construction of the present heater elements will be described. Each of the heater elements 38 and 40 are constructed as a layered assembly wherein a supporting mica sheet assembly, indicated generally at 70, is interposed between an interior mica insulation board 72 and an exterior mica insulation board 74.

Since the physical and chemical properties of mica insulation board are well known to those skilled in the art, further detailed discussion of these materials is not deemed necessary.

Still referring to FIGS. 5A and 5B, it will be noted that the supporting mica sheet assembly 70 is fabricated with a plurality of notches 76 and 76a, which are formed at predetermined intervals along the opposite lateral ledges thereof. During the construction process of the heater elements, the heater wire 53 is drawn across a pair of diagonally opposed notches as at 76 and 76a, wrapped in continuous revolutions around the supporting mica sheet 70, and advanced in this manner along the entire length thereof as shown by directional arrows. It will be appreciated that when constructed using the aforementioned technique, a so-called double sided heating element having heating wire 53 disposed on both sides thereof is produced.

Using an alternative construction technique shown in FIG. 5B, a so-called one-sided heater element can be produced by initially drawing the heater wire 53 across the supporting mica sheet 70 as described in the first step hereinabove. Next, the wire 53 is interlaced between adjacent notches 76 on the same lateral edge of the supporting mica sheet 70 as shown by directional arrows. Thereafter, the wire 53 is again drawn across the supporting mica sheet 70 to the next diagonally opposed notch 76a on the opposite lateral edge thereof Next, the wire 53 is interlaced between adjacent notches 76a on the opposite lateral edge of the supporting mica sheet.

In this manner, it will be understood that a so-called one-sided heater element having at least 75% of the total amount of heater wire 53 used in its construction disposed on one surface of the supporting mica sheet 70 may be produced. Such a one-sided heater element is advantageous in reducing the radially outward deflection of heat generated by the heating elements thereby improving heating efficiency and providing a cooler outer surface in the event of user contact for safety purposes.

In both of the above described embodiments, the supporting mica sheet 70 is permanently captured between the interior and exterior insulation boards 72 and 74 and secured at periodic intervals as shown by rivets 75 or other suitable fasteners to maintain alignment of the layers.

Figure 6:
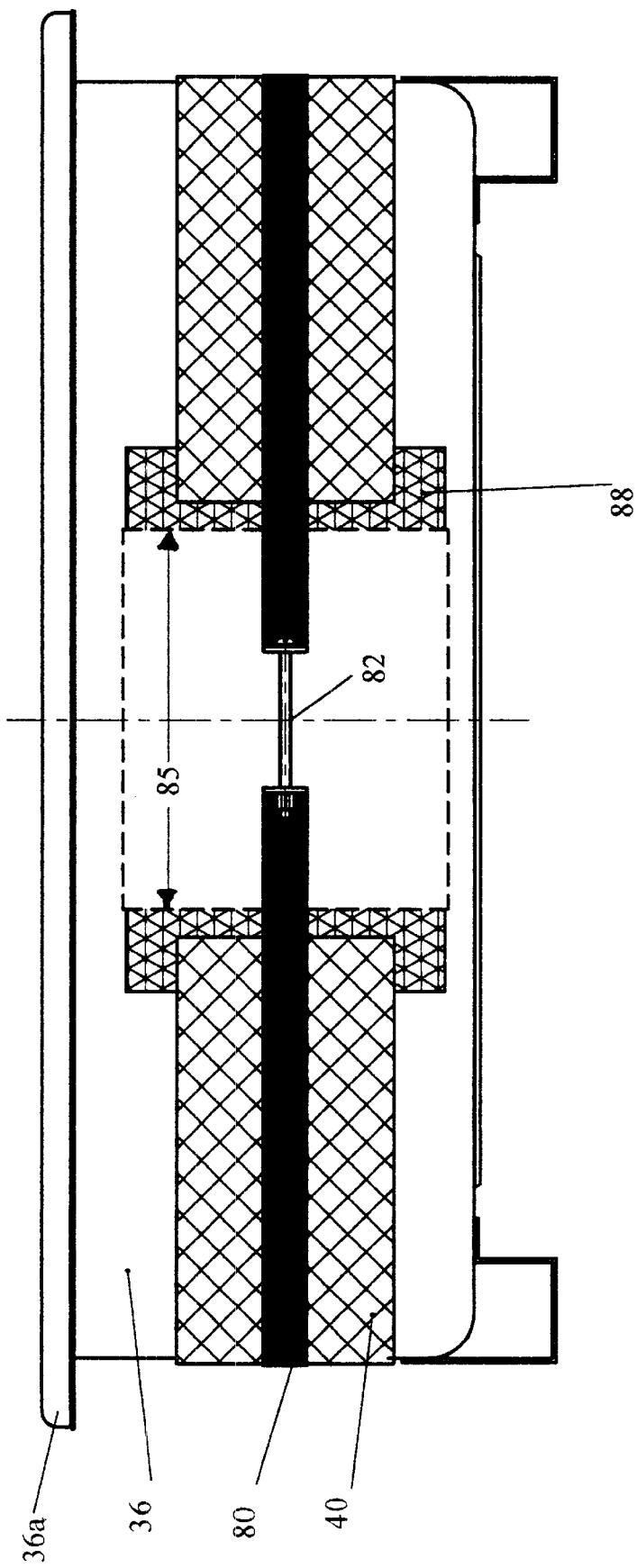
FIG. 6 is an enlarged front elevational view showing the wrap-around heating element installed about the deep well member of the present multifunctional cooker.

In an assembly procedure of the present cooker 10, the wrap-around heating element 40 is secured to an outer surface of the deep well member 36 by use of an adjustable band clamp, indicated generally at 80 as shown in FIG. 6. The band clamp 80 is conducted of sheet metal such as steel in the form of an elongated belt and includes a turn buckle mechanism, indicated generally at 82, which is capable of securing the heater belt 40 about the outer periphery of the deep well member 36.

The wrap-around heating element 40 is mounted onto studs 77 which are coupled to and project from the band clamp 80 in predetermined locations. A plurality of elongated slots 79 are formed in the terminal ends of wrap-around heater element 40 so as to be positioned in alignment with studs 77. Studs 77 engage the elongated slots 79 during assembly and provide for slight differences in length and movement between the interior and exterior insulation boards 72 and 74 and supporting mica sheet 70.

It will be noted that the wrap-around heater element 40 is fabricated to a predetermined length and during assembly is positioned so as to leave a gap as at 85 corresponding to the position of the temperature and function control switches, which are subject to heat damage. In the construction process the gap 85 may be filled with fiberglass insulation, material 88 mica insulation board or other appropriate insulating materials to protect the temperature and multi-function controls.

It is anticipated that the present multifunctional cooking system will be utilized in combination with various cooking accessories such as lift-racks, frying baskets and/or optional serving sets which are insertable into the cooking well 37 and utilized for various cooking modes such as steaming, stir-frying, roasting, etc.

In summary, the present invention has been developed to provide a multifunctional cooking system including a deep well cooker that includes a bottom heating element and a flexible, wrap-around heating element which is disposed about the deep well member for heating the sides thereof The bottom heating element and the wrap-around heating element are interconnected by a temperature control switch for heat regulation and a multi-function control switch for selectively energizing the desired heating elements of the system for different cooking modes.

Although not specifically illustrated in the drawings, it should be understood that additional equipment and structural components will be provided as necessary, and that all of the components described above are arranged and supported in an appropriate fashion to form a complete and operative system incorporating features of the present invention.

It is also understood that variations may be made in the present invention without departing from the scope of the invention. For example, the present multifunctional cooking system may utilize double-sided and also single-sided heater elements as disclosed herein, which may be advantageous for specific applications.

Moreover, although illustrative embodiments of the invention have been described, a latitude of modification, change, and substitution is intended in the forgoing disclosure, and in certain instances some features of the invention will be employed without a corresponding use of other features. Accordingly, it is appropriate that the appended claims be construed broadly and in a manner consistent with the scope of the invention.

What is claimed is:

1. A deep well cooker comprising:

an outer housing having a lid member;

a deep well member residing within said housing, said deep well member having a bottom surface with integrally formed sidewalls and an open top;

heating means including a bottom heating element and a wrap-around heating element radially disposed about said deep well member and positioned intermediate said housing and said deep well member;

temperature controlling means electrically interconnected to said heating means for regulating the temperature of said heating elements; and function controlling means electrically interconnected to said temperature controlling means and to said heating elements enabling said bottom heating element and said wrap-around heating element to be selectively energized to provide variable cooking modes.

2. The deep well cooker of claim 1 wherein said bottom heating element is formed by wrapping an electrical heating wire about a mica insulation board along the entire length thereof in a predetermined configuration.

3. The deep well cooker of claim 2 wherein said mica insulation board includes a plurality of notches formed in the lateral edges thereof at periodic intervals such that said heating wire can be engaged within said notches in a repeating pattern.

4. The deep well cooker of claim 3 wherein said heating wire is alternately traversed across said mica insulation board between diagonally opposed pairs of said notches and then interlaced between adjacent pairs of said notches in a predetermined pattern such that at least 75% of said heating wire is disposed on a first side of said mica insulation board.

5. The deep well cooker of claim 3 wherein said mica insulation board is constructed in the form of an elongated belt.

6. The deep well cooker of claim 5 wherein said heating wire is wrapped in continuous revolutions about said mica insulation board between diagonally opposed pairs of said notches to produce said repeating pattern.

7. The-deep well cooker of claim 6 wherein said mica insulation board including said heater wire is captured between a plain interior and a plain exterior mica insulation board to form a heater belt assembly.

8. The deep well cooker of claim 7 wherein said heater belt assembly is riveted in periodic intervals along the length thereof to maintain alignment of said mica insulation boards after installation of said assembly about said deep well member.

9. The deep well cooker of claim 8 wherein said heater belt assembly is secured to the external periphery of the side wall of said deep well member by an adjustable band clamp.

10. The deep well cooker of claim 3 wherein said heater wire is tightly intertwined at the terminal ends thereof with a bundle of nickel lead wires to form a heat sink to insulate said temperature controlling means from said heating elements.

11. The deep well cooker of claim 10 wherein said twisted bundle of heater wire and said nickel lead wires is covered with a fiberglass insulation sleeve and at least one ceramic sleeve to form a lead wire assembly.

12. The deep well cooker of claim 1 wherein said housing and said deep well member are rectangular in configuration.

13. The deep well cooker of claim 1 wherein said housing and said deep well member are oval in configuration.

14. The deep well cooker of claim 1 wherein a removable cooking well conforming to the dimensions of said deep well member is provided.

15. An improved deep well cooker having an outer housing, a deep well member residing within said housing and also having a bottom surface with integrally formed side walls and an open top defining a cooking pot, a bottom heating element disposed adjacent said bottom surface intermediate said housing and said deep well member, and a temperature control switch electrically interconnected to said bottom heating element wherein the improvement comprises:

a wrap-around heating element radially disposed about said side walls and intermediate said deep well member and said housing and electrically interconnected to said temperature control switch; and a multi-function control switch electrically interconnected to said temperature control switch, said bottom heating element, and said wrap-around heating element enabling each of said heating elements to be selectively energized to provide variable cooking modes for said cooker.

16. A method of fabricating a wrap-around heating element for a deep well cooker, said method comprising the steps of:

producing an elongated sheet of supporting insulation board with preset dimensions;

cutting a plurality of opposed notches into the lateral edges of said insulation board at predetermined intervals;

providing an electrical heating wire having terminal ends;

wrapping said electrical heating wire about said insulation board to engage said notches in a repeating pattern;

layering said supporting insulation board with said heating wire wrapped thereon between interior and exterior sheets of insulation board;

fastening said sheet of supporting insulation board to said interior and said exterior sheets of insulation board at predetermined locations to permanently capture said supporting insulation board therebetween;

providing a bundle of nickel conductors;

twisting said terminal ends of said heating wire with said nickel conductors using a predetermined tension;

applying a fiberglass insulation sleeve to said twisted wire bundle;

attaching at least one ceramic insulation sleeve over said fiberglass insulation sleeve;

crimping a wire connector onto each end of said terminal ends to produce a lead wire assembly; and attaching said wrap-around heating element to an adjustable band clamp for installation about said deep well cooker.

17. The method of claim 16 wherein the step of wrapping further comprises the steps of:

drawing said heating wire across said supporting insulation board between diagonally opposed pairs of said notches in continuous revolutions; and advancing said heating wire along the entire length of said insulation board.

18. The method of claim 17 wherein the step of drawing further includes the steps of:

interlacing said heating wire between adjacent notches along a lateral edge of said supporting insulation board;

traversing said wire across said supporting insulation board between diagonally opposed pairs of said notches; and repeating said step of interlacing between adjacent notches along an opposite lateral edge of said supporting insulation board after each traversal of said supporting insulation board to produced a one-sided heater element.

19. The method of claim 18 wherein the step of fastening is carried out by rivets.

* * * * *